United States Patent

Lenglet et al.

[11] Patent Number: 5,965,013
[45] Date of Patent: Oct. 12, 1999

[54] STEAM CRACKING METHOD AND PLANT USING CONTROLLED INJECTION OF SOLID PARTICLES INTO A QUENCHING EXCHANGER

[75] Inventors: Eric Lenglet, La Celle Saint Cloud; Paul Broutin, Chaponost; Jean-Pierre Burzynski, Sainte-Foy-Les Lyon; Hervé Cazor, Vienne; Roland Huin, Montesson La Borde, all of France

[73] Assignee: Institut Francais Du Petrole Procedes Petroliers et Petrochimques Eric Lenglet, France

[21] Appl. No.: 08/836,148

[22] PCT Filed: Dec. 22, 1995

[86] PCT No.: PCT/FR95/01721

§ 371 Date: Jun. 25, 1997

§ 102(e) Date: Jun. 25, 1997

[87] PCT Pub. No.: WO96/20259

PCT Pub. Date: Jul. 4, 1996

[30] Foreign Application Priority Data

Dec. 26, 1994 [FR] France .................................. 94 15744

[51] Int. Cl.$^6$ ............................. C10G 9/36; C10G 9/28; F28D 7/00; F28D 21/00

[52] U.S. Cl. ..................... 208/130; 208/126; 208/48 R; 585/648; 585/652; 585/950; 422/200; 422/201; 422/202; 422/207; 422/213; 422/217

[58] Field of Search .................................. 422/200, 201, 422/202, 207, 213, 217; 110/216; 208/48 R, 48 AA, 126, 130; 585/648, 652, 950

[56] References Cited

U.S. PATENT DOCUMENTS

| 5,177,292 | 1/1993 | Lenglet | 585/648 |
| 5,183,642 | 2/1993 | Lenglet | 422/213 |
| 5,186,815 | 2/1993 | Lenglet | 208/48 R |

*Primary Examiner*—Walter D. Griffin
*Attorney, Agent, or Firm*—Miller, White, Zelano & Branigan, P.C.

[57] ABSTRACT

A facility and a process for steam cracking include controlled injection of solid particles into a transfer line exchanger (3). The particles are injected via injection lines, numbering between 1 and 8, just upstream of an impact-diffuser (6) comprising solid surfaces disposed on either side of the line for transfer of the cracked gases to the exchanger; this impact-diffuser is located in the inlet cone (2) of the exchanger, is permeable to the gases via a plurality of passages and at least 70% opaque viewed from the transfer line.

22 Claims, 4 Drawing Sheets

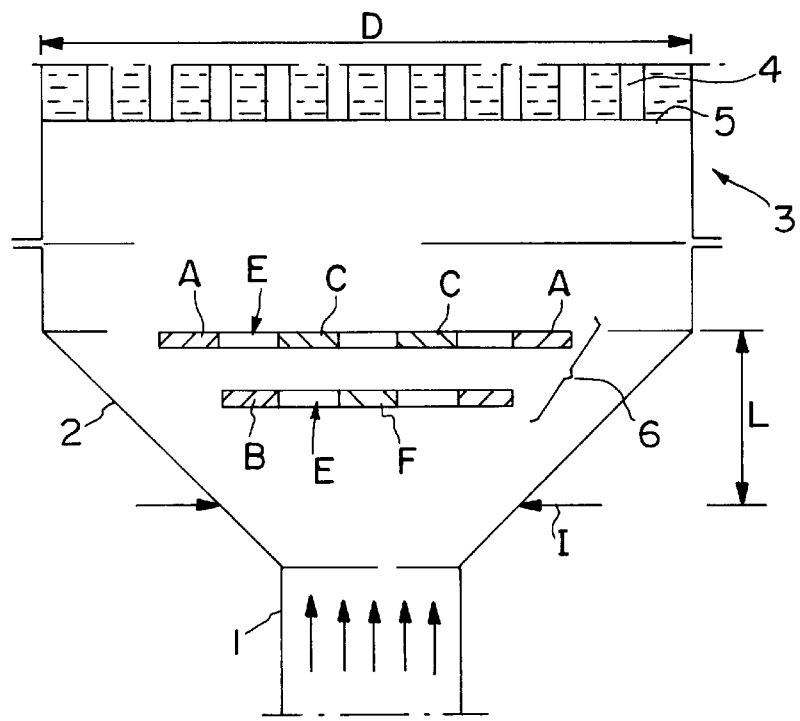
F I G. 2A
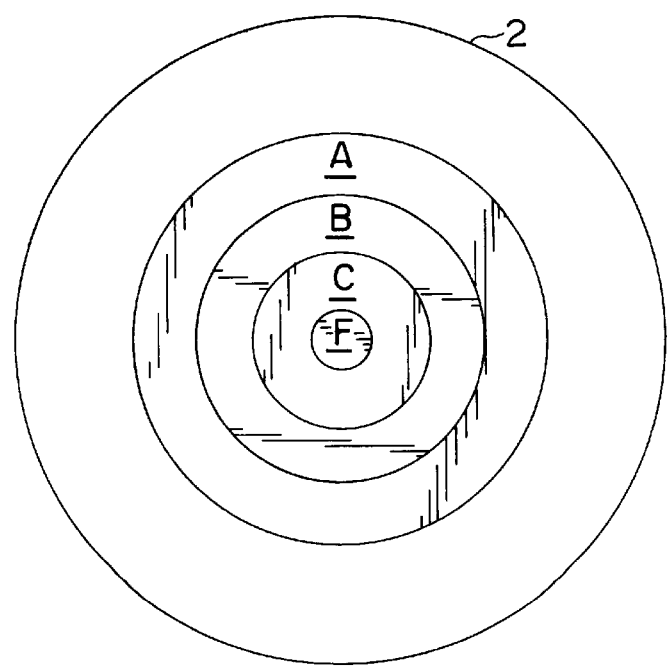
F I G. 2B

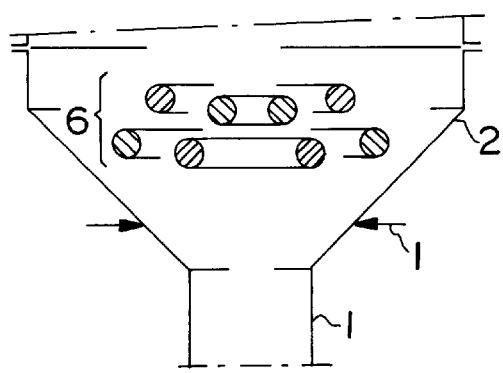
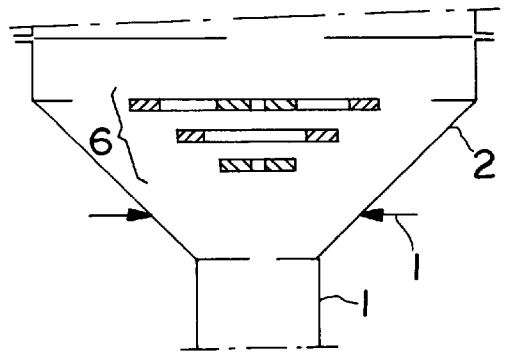
FIG. 3   FIG. 4A
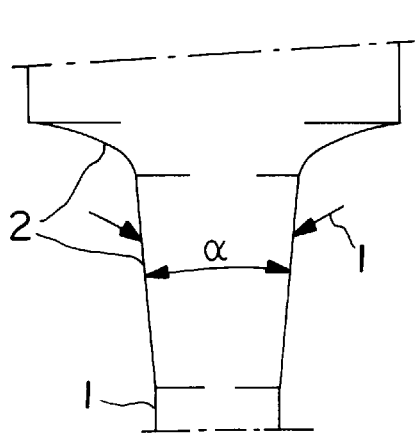
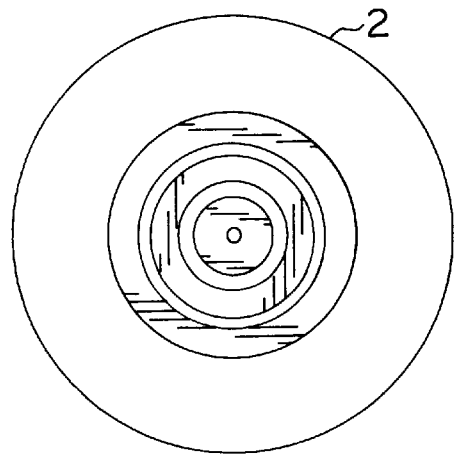
FIG. 5B   FIG. 4B
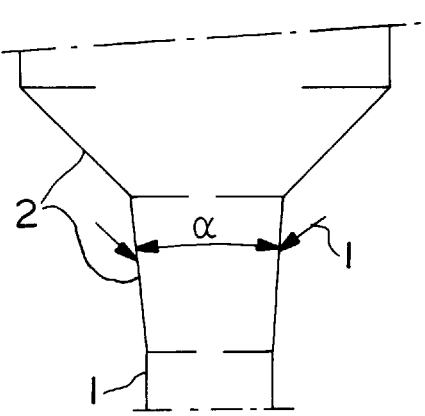
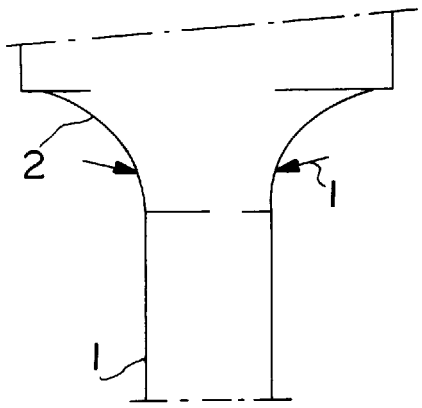
FIG. 5A   FIG. 5C

STEAM CRACKING METHOD AND PLANT USING CONTROLLED INJECTION OF SOLID PARTICLES INTO A QUENCHING EXCHANGER

BACKGROUND OF THE INVENTION

1. Field of the Invention

The invention relates to a facility for steam cracking of hydrocarbons and an implementation process, comprising a step of decoking by controlled injection of solid particles.

2. Description of the Prior Art

The prior art is illustrated by FR-A-1.433.702.

The steam cracking process is the basic process in the petrochemicals industry and consists of high temperature cracking then rapid cooling of a feed of hydrocarbons and steam. The main operating problem arises from the deposition of carbon-containing substances on the internal walls of the facility. These deposits, constituted by coke or condensed heavy pyrolysis tars, which are coagulated to a greater or lesser extent, limit the heat transfer in the cracking zone (coils of pyrolysis tubes) and the indirect cooling zone (effluent transfer line exchanger) necessitating frequent stoppages to decoke the facility.

The applicants have proposed (EP-A-419 643, EP-A-425 633 and EP-A-447 527) a decoking process for use during the operation of steam cracking facilities, by injection of solid erosive particles to overcome coking problems and to obtain continuous or substantially continuous steam cracking (for example with cycle periods of the order of one year).

The solid erosive particles can be injected upstream of the cracking zone of each furnace so that they scour the coke deposited in the pyrolysis tubes, then downstream that of the effluent transfer line exchangers.

Injections are carried out in line, that is to say either, preferably, during the normal operation of the furnace or during periods when the hydrocarbon feeding is interrupted briefly, the furnace then being swept by a delivery of steam and remaining connected to the downstream sections of the facility (primary furnace, cracked gas compression and so forth). This steaming, in the absence of oxygen, can also be used for steam decoking of the furnace tubes when it is carried out over longer durations.

To implement flexible steam cracking, compatible with the use of heavy feeds (gas oil, vacuum distillates) in an existing steam cracking facility designed for cracking naphtha, it was found essential to properly scour the coke deposited in the effluent transfer line exchangers and that decoking during operation of the transfer line exchangers allowed, in an unexpected manner, an existing steam cracking facility to be made compatible with a wide variety of feeds. It was also found, in an unexpected manner, that the coke deposited in the transfer line exchangers was far easier to remove by erosion than the coke deposited in the pyrolysis tubes, and that the process previously proposed for complete decoking of the facility using fine erosive particles was very difficult to implement in a reliable manner with flexible operation under necessarily variable conditions: the configuration of the pyrolysis tubes cannot be adapted for all of the feeds to ensure a correspondence between the local erosive intensity and the local speed of coking (the nature of the coke and its hardness possibly also being greatly varied from one feed to another); on the other hand, with flexible operation, that is with a variable regime of operating conditions, feed type and degree of dilution, the loss of feed and skin temperature of the tubes are no longer reliable indicators of the state of coking of a bundle of pyrolysis tubes, which therefore cannot be determined and controlled in real time.

In order to remedy these disadvantages, a new process linking at least preponderantly chemical decoking of the pyrolysis tubes with at least preponderantly erosive decoking of the transfer line exchangers is proposed. The process thus comprises erosive decoking of the transfer line exchangers, which requires means suitable for introducing the erosive particles into said exchangers.

For most facilities, these transfer line exchangers (TLE's) are of the multi-tube type with an inlet tube plate which can comprise, for example, 50 to 100 cracked gas circulation tubes, each tube being cooled, most often, by circulation of pressurised water in an annular space around said tube.

Each exchange comprises an "inlet cone" with a tapering configuration, connected to the transfer line for the cracked gases, itself connected to the pyrolysis tubes of the corresponding upstream cracking zone.

The technical problem for which a solution, forming the subject-matter of the invention, has been found, relates to the distribution of the particles in the different tubes of the exchanger.

The process does not require a strictly equal division of the quantities of particles in each tube, but relatively low differences in distribution have been sought, and in particular it must be avoided that any one of the tubes receives for example 10% or conversely 10 times more particles than the average value. Indeed, a tube poorly supplied with erosive particles may become blocked because of insufficient decoking, while an over-supplied tube could risk being eroded by the excessive amount of particles.

The distribution of particles must also be carried out without causing substantial erosion of the tube plate of the exchanger.

This technical problem is made much more delicate by several elements and procedural constraints:

1) the very high temperature (typically 850° C.) at the TL exchanger inlets,
2) the intensive coking in this zone, with the risk of blockage of the particle supply lines,
3) the very high circulation velocities, and turbulence in this zone (typically 100 m/s and more)
4) the possibility of impaction of mass fragments of coke detached from the walls upstream, and
5) the relative fragility of the inlet tube plate of the TLE's, having generally a thickness of only approximately 10 mm, with respect to erosion problems.

The device for introducing and distributing the particles therefore has to be at the same time:

robust, in order to be resistant to high temperatures, and to the risks of shocks and erosion, reliable, particularly with respect to the problems of blockage with coke, high-performance from the point of view of distribution, in local high turbulence conditions, and not presenting increased risks of erosion of the tube plate.

Techniques for injecting and distributing solids in powder form or atomised liquids into a multi-tube exchanger are already known.

These techniques consist of carrying out multi-point injection using injection banks to distribute the solids or the liquids directly in front of the exchanger tubes. These injections are advantageously carried out at a large number of points (for example 15 or 20) or even using a number equal to that of the exchanger tubes) to improve distribution.

The injection banks are generally straight or circular lines comprising nozzles or injection orifices.

This known solution was tried for the application under consideration and rapidly abandoned for several reasons:

deformation of the banks, which were too fragile, successive blockages of the injection at numerous points by coke, probably because of aerodynamic disturbances between the different injection points caused by turbulence and intense recirculation in the inlet cone of the exchanger; these turbulences being able to cause halting of the flow at certain injection points, and blockage thereof.

The technical problem is in fact very difficult to solve as the constraints are apparently contradictory:

If it is desired that the particles be distributed in a substantially equal manner, it is logical to carry out injection with multi-point spatial distribution, with a large number of points, which presents risks of blockage.

If a small number of injection points are used, these are disposed in particular upstream (for example at 50 times the diameter of the line) so that the particles have time to be distributed properly in the gas. In this case, the velocities of the particles are increased as the particles have time to be greatly accelerated by the high-velocity gas circulation, and there are risks of erosion of the tube plate.

If a central impacter is added, facing the transfer line, in order to avoid direct impact of the particles on the tube plate, the particles go around the periphery thereof, and the distribution of the particles in the downstream tubes is less satisfactory.

One of the objects of the invention is to remedy the disadvantages of the prior art and to address the technical problem mentioned hereinbefore.

SUMMARY OF THE INVENTION

The invention thus relates to a facility for steam cracking of hydrocarbons comprising at least one cracking furnace provided with at least one cracking zone with at least one pyrolysis tube connected downstream by means of a transfer line (1) to an inlet cone (2) of a transfer line exchanger for the effluent of this zone, of the multi-tube type with an inlet tube plate (5), the facility also comprising at least one injection line (1) for solid particles for at least partial removal, carried out in line, of the coke deposited in the exchanger tubes, characterised in that it comprises:

a) a particle impacter-diffuser (6), comprising solid surfaces disposed opposite the transfer line (1), in the interior of said inlet cone (2), said impacter-diffuser being permeable to gases by means of a plurality of gas passages, but at least 70% opaque seen from said transfer line (1) situated upstream, b) said injection line (1) opening out into a point of introduction of the particles, situated at a distance L upstream of the impacter-diffuser, not exceeding 2.5 times the diameter D of the tube plate of the transfer line exchanger.

An inlet cone is understood to be a zone with a substantially increasing cross-section, generally with shape which is at least partially tapered, joined upstream to the line for transferring the cracked gases originating in the pyrolysis tubes, this line being cylindrical in cross-section and downstream of the tube plate of the transfer line exchanger. This cone can also be splayed in a "trumpet" as shown in the drawings hereinafter.

The term "cone" of the exchanger, well known to the man skilled in the art, can in fact cover a wide range of geometric configurations, allowing the matching of the cylindrical transfer line (or sometimes two lines) with the tube plate of the exchanger, which has a far larger diameter (typically of the order of 1 m).

Injection of particles "in line" is understood to be injections of particles during the operation of steam cracking (in general), or possibly injections during phases of short duration, less than 2 hours and preferably 0.5 hours, of circulation of steam only, the feeding of hydrocarbons being interrupted. This possibility can be used when particularly heavy feeds are cracked, recovering the particles, and when it is desired that any risk of condensation of tars on the recovered particles, making them adhesive and rendering the facility inoperable, is to be avoided.

In all cases of in line injection, the furnace is not disconnected from the downstream sections (direct cooling, compression, fractionation and so forth).

The term impacter-diffuser refers to a solid body, generally metallic, located on the trajectory of the flow and able to divert the gases in several directions, and to obtain direct impaction upon itself of a large portion of the incident solid particles transported by the gases, in order to avoid direct impact of said particles on the tube plate disposed downstream.

An at least 70% opaque impacter-diffuser is understood to be an impacter-diffuser wherein at least 70% of the lines of flow of the transfer line parallel to the axis of said line hit the impacter.

In other words, the surface of the different elements of the impacter-diffuser projected onto the cross-section of the transfer line represents at least 70% of said section. (The cross-section of the line is the surface delimited by the circle corresponding to the internal diameter of the cylindrical line, just upstream of the cone, the surface being projected parallel to the axis of the line).

The gas passages can be non-communicating or communicating, for example at extremities of the solid surfaces which form the impacter-diffuser, as will be described with reference to FIG. 6.

This facility comprises numerous advantages compared to the prior art.

1) The impacter-diffuser has an jet-breaking function because of its position and its permeability to gases via a plurality of gas passages. There is therefore splitting of the main flow and a plurality of secondary flows. These flows or secondary jets have a tendency to disperse and weaken much more rapidly than a single central jet, the strength of which is much greater; moreover, these jets generally do not hit the tube plate at the same point. This jet-breaking effect thus effectively limits the risks of erosion.

2) The impacter-diffuser has a second function of protecting the downstream tube plate: as it is opaque to a minimum of 70% with respect to the flow lines of the upstream flow, it thereby avoids direct impact of the greater part of the particles incident on the tube plate.

3) There is lastly a diffusing function (that is to say of particle distribution: that is the particles which come into contact with the surfaces of the impacter rebound, but in an irregular manner as a function of their mass and of the angle of incidence in particular, and are then transported by the secondary gaseous jets (the jet-breaking effect of the impacter) in several directions.

As, on the other hand, the injectors are disposed at a lesser distance upstream from the impacter-diffuser, the jets of particles (which do not mix instantly with the cracked gases)

are only very partially accelerated or dispersed at the moment of their arrival at the level of the impacter-diffuser. These jets, which are poorly distributed in the cracked gases, thus arrive at a relatively slow velocity, rebound, "split" on the impacter-diffuser and disperse via the different free spaces of the impacter-diffuser.

This relatively slow velocity of the jets of solid particles has two consequences for the level of risks of erosion:

the erosion of the impacter is minimised, the erosion of the tube plate by the minor fraction of particles which do not rebound on the impacter, but cross it directly, is also minimised. Moreover, the dispersion of the particles by the flows or secondary gaseous jets (there is in fact a double diffusion: directly, that of the gases and after rebounding, that of the particles) improves the spatial distribution of the particles in the different tubes of the exchanger.

Furthermore, as the injectors do not themselves carry out the function of spatial distribution of the injection points, they do not need to penetrate the cone, which considerably limits their mechanical fragility and the risks of deformation.

As lastly the impacters can all be disposed in an identical manner (no "spatial" distribution), there is no aerodynamic effect causing downstream pressure distortion between the different injectors, which considerably limits the risks of blockage.

Preferably, the distance L of the extremities of the injectors upstream of the impacter-diffuser is between 0.1×D and 1.0×D (D being the diameter of the tube plate), and preferably between 0.15×D and 0.8×D.

These limitations of L allow the further reduction of kinetic energy of the particles at the impacter-diffuser level.

In a preferred manner, the impacter-diffuser is opaque to at least 90%, or substantially 100% opaque seen from the transfer line, which limits or substantially eliminates the quantity of particles crossing the impacter without rebounding, being braked and being dispersed.

The number of injection lines is advantageously between 1 and 8, in particular and preferably between 2 and 6 (including boundaries): indeed, because of the spatial dispersion role played by the impacter diffuser, there is no need to ensure significant spatial dispersion with a large number of injection points. Figures 7A, 7B and 7C show various configurations and numbers of injection line (I).

In the same way, there is no need to use injection lines comprising nipples entering the cracked gas flow. Thus it is provided only that the extremities of the injection lines are located substantially at the level of the internal surface of the assembly formed by the transfer line and the inlet cone. In a preferred manner, the extremities of these injection lines are located in the zone of the inlet cone of the exchanger, and in particular are flush with the level of the internal surface of this inlet cone. The use of injection points in the zone of the inlet cone brings these injection points of the impacter-diffuser nearer together, which is advantageous from the point of view of protection against erosion.

Because of the limited number of injection points, the extremities of the injection lines can advantageously be located on the same level, in the direction of flow of the effluent, for example on the same level of the internal surface of the inlet cone.

This reduces the aerodynamic disparities at the level of the injection points and greatly limits the risks of blockage of certain injection points by deposits of coke.

Generally the inlet cones of the transfer line exchangers (TLE's) comprise, on the upstream side, a part of the cone with a tapering internal surface with an angle to the highest point of (generally) less than or equal to 20° and preferably 15° and typically approximately 10°.

According to a preferred characteristic device according to the invention, the injection lines for the particles open out at the level of this decelerating zone, in particular in the second downstream half of this zone. In this way the velocity of the particles is reduced because the cracked gases have already been slowed down or begin their deceleration immediately downstream of the injection points.

It is moreover particularly interesting that the injection points be situated at a level where the cross-section of the flow passage is increased by at least 25% and preferably between 40 and 400%, with respect to the cross-section of the passage of the terminal part of the transfer line upstream of the transfer line exchanger.

These injections made at points very much downstream, at reduced velocity of flow of cracked gases, which in principle is disadvantageous for the distribution and the proper division of the particles in the exchanger tubes, are made possible by the multi-function action of the impacter-diffuser: protection against erosion, direct diffusion of the gases, diffusion of particles after rebounding, and because of the increased opacity of this impacter-diffuser and its permeability.

The permeability of the impacter-diffuser can be defined as the minimum fraction of void obtained by projecting the various cross-sections of said impacter-diffuser perpendicularly with respect to the axis of the cone, onto the cross-section of the transfer line. Advantageously this porosity will be at least 30% and preferably between 40 and 60%.

According to a characteristic variation, the impacter-diffuser can comprise solid surfaces and voids disposed along two levels at least in the direction of the flow of the effluent, the voids at one of the two levels being substantially opposite the solid surfaces of the other level.

This arrangement, which will be described in more detail with reference to the drawings, allows there to be at the same time increased opacity and increased permeability, which is advantageous with respect to the technical problem of preventing erosion (opacity) and of division of the particles which is improved by correct permeability.

The impacter can be constituted by discs or toroidal rings with a substantially circular, rectangular or square cross-section, which can be mechanically connected to one another, as well as to the inlet cone of the exchanger, by fixing brackets or an equivalent technique, suitable for the problems caused by expansion.

According to another variation, the impacter-diffuser can comprise a plurality of rectangular bars, with a rectangular, square or preferably circular cross-section, substantially parallel and disposed on at least one level, preferably on two levels.

According to a particularly advantageous variation of the invention the bars are supported by a single, central brace substantially perpendicular to the axis of said bars. The extremity of the bars is advantageously situated at a distanced from the cone of at least 30 mm and preferably of at least 50 mm. This allows removal of fragments of coke, originating from a peeling in the furnace or in the pyrolysis tubes upstream, in the substantially annular space around the impacter. In this way any obstruction of the impacter by fragments of coke is prevented.

If there were two braces, the risk of obstruction would be significantly increased in the zone between these braces, the fragments being prevented from sliding towards the outside.

The invention also proposes a steam cracking process, which can be implemented in one of the facilities previously described, characterised in that effluent cracked gases from a cracking zone are introduced via a transfer line, tapered towards the highest point at an angle of less than or equal to 20°, upstream of the tube plate of a transfer line exchanger, such as to reduce the velocity of these gases to a value of between 0.07 and 0.7 times their velocity in the terminal part of the transfer line, in that erosive solid particles are injected in a discontinuous manner into these gases, the velocity of which is reduced, from an appropriate distance of at the most 1 meter upstream of an impacter-diffuser, permeable to the gases via a plurality of passages and at least 70% opaque viewed from the transfer line, and that the mixture of particles and cracked gases is circulated downstream of the impacter-diffuser in the tubes of the transfer line exchanger to limit its coking, the quantities of injected particles being sufficient for the outlet temperature of the transfer line exchanger not to increase by more than 100° C. per month, and preferably 30° C. per month.

This process according to the invention allows a very significant degree of flexibility to be imparted to a steam cracking facility designed for naphtha and to crack, for example, condensates, gas oils or vacuum distillates; the monitoring of the process (quantities of solid particles necessary) is very simple and follows from the examination of the outlet temperature of the transfer line exchanger, which reliably indicates its degree of coking, even in a flexible regime.

The suitable quantities of solid particles depends to a great extent on the feeds, operating conditions and the choice of erosive particles. Generally between 20 and 3,000 ppm will be injected, particularly between 20 and 1,500 ppm of solid particles (average value by weight with respect to the cracked gases over one steam cracking cycle).

The instantaneous delivery can be, at the time of injection, between 0.5 and 25% by weight with respect to the cracked gases, particularly between 1 and 10%.

Suitable particles are typically particles with an average diameter (at the 50% point) of between 0.02 and 4 mm, particularly between 0.07 and 0.8 mm.

Preferably being at least in part angular (for example at least 20%), they can be constituted mainly by materials of the group formed by stabilised coke (in particular coke which has been calcined at a minimum of 850° C.), silicon carbide, and simple or combined oxides of silicon, aluminium and zirconium.

BRIEF DESCRIPTION OF THE DRAWINGS

The invention will be more easily understood with reference to the following drawings, which illustrate in a schematic manner the facility, and various embodiments according to the invention, among which:

FIG. 2A shows the characteristic part of a facility according to a preferred embodiment of the invention.

FIG. 2B shows schematically a plan view of the surfaces ABCF of the impact-diffuser seen from the tube plate (5).

FIG. 3 shows a impacter configuration comprising toroidal rings with circular cross-section.

FIG. 4A shows an impacter configuration with rectangular rings.

FIG. 4B shows a plan view of the rectangular rings of FIG. 4A.

FIGS. 5A-5C show various possible embodiments of the inlet cone.

Figure 1:
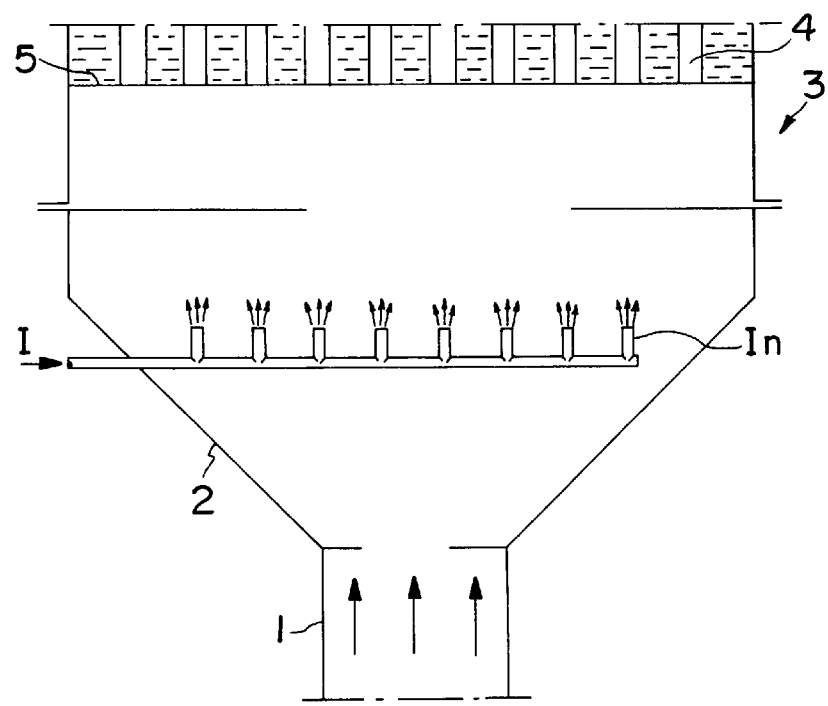
FIG. 1 shows a supply of particles, according to a known manner of the prior art, with multi-point spatial distribution.

According to FIG. 1, an indirect transfer line exchanger (3) for the steam cracking effluent originating in a steam cracking zone with pyrolysis tubes, not shown, is connected to this zone via a transfer line (1) opening out into the inlet cone (2) of the exchanger. This exchanger is of the multi-tube type and comprises a plurality of tubes (4) for circulation of the cracked gases for sudden cooling thereof, connected to a tube plate (5).

Classically, to distribute the particles and to divide them, injection banks are used (I), only one of which is shown, with a plurality of injection points (In) to carry out the spatial division of the particles.

The large number of points In and the heat, aerodynamic and chemical (coking) conditions are very disadvantageous for this device, and cause in particular problems of blocking and deformation of the banks.

Figures 7A, 7B, 7C:
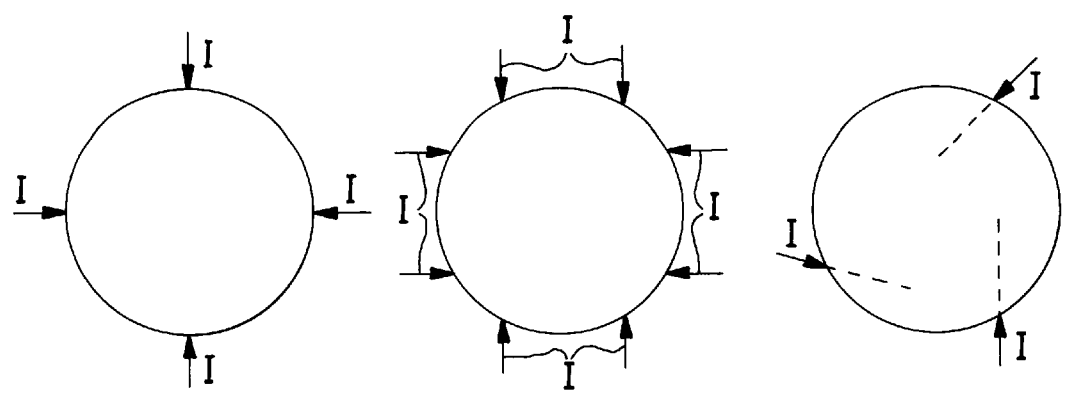
FIGS. 7A, 7B and 7C show various configurations and numbers of injection line (I) on inlet cone (2).

FIG. 2 shows the characteristic part of a facility according to the invention: a limited number of injectors (I), (1 to 8 and preferably 2 to 6as shown in FIGS. 7A–7C), allow particles to be injected at the same level of the cone (2) of the transfer line exchanger. The injection lines (I) open out at injection points on the internal surface of the cone (2), just upstream of an impacter-diffuser, comprising a plurality of surfaces (A, B, C, F) as well as voids (E) forming several gas passages. This impacter-diffuser is located opposite the transfer line (1) downstream of the lines of flow of said transfer line, indicated by the arrows.

Study of FIG. 2 shows that if the arrows situated in the transfer line (1) are elongated, these arrows hit at least one of the solid surfaces A, B, C, F. This impacter-diffuser (6) is thus 100% opaque seen from the transfer line (1). It is nevertheless permeable to gases by virtue of the voids (E) forming a plurality of gas passages. Advantageously an impacter-diffuser would be used comprising a greater number of solid surfaces (for example between 8 and 20) and of gas passages (E) than represented in FIG. 2.

FIG. 2A shows schematically a plan view of the surfaces ABCF of the impacter-diffuser seen from the tube plate (5).

In accordance with the invention, the injection points situated at the extremities of the injection lines (I) are disposed at a reduced distance L, upstream of the impacter-diffuser (by definition in a position defined by the solid surfaces furthest downstream). According to the drawing, L is smaller than the diameter (D) of the tube plate (5) of the exchanger.

As can also be seen, this impacter comprises two levels of solid surfaces: A and C on the one hand and B and F on the other hand, the voids (E) on one of the levels being substantially opposite the solid surfaces of the other level. A, B, C, F are toroidal rings (A, B, C) or a disc (F) with a rectangular cross-section; they can be made from refractory alloy (for example HK 40) and joined to one another and to the cone (2) by fixing brackets or other mechanical devices which are not shown.

The total angle of the cone at the level of the transfer line (I) connections is preferably less than 20° and generally approximately 10°, which is not shown in the FIG., for simple drawing reasons.

The injectors (I) can be disposed perpendicularly to the axis of the cone (according to the drawing) or can be inclined upstream or inclined downstream.

FIGS. 3 and 4 (4A and 4B) show two other impacter configurations comprising toroidal rings with circular cross-section in FIG. 3 and rectangular in FIG. 4A.

FIG. 5 (FIGS. 5A, 5B, 5C) shows various possible embodiments of the inlet cone, comprising a tapering deceleration zone (FIGS. 5A and 5B) with a total angle of a $\alpha \leq 15°$, or without a deceleration zone but with a "trumpet" profile (FIG. 5C). FIGS. 5A and 5B show the channels 1 opening out into the deceleration zone (in its second downstream half). The impacter-diffusers are not shown in FIGS. 5A, B, C for simple drawing reasons.

Figure 6A:
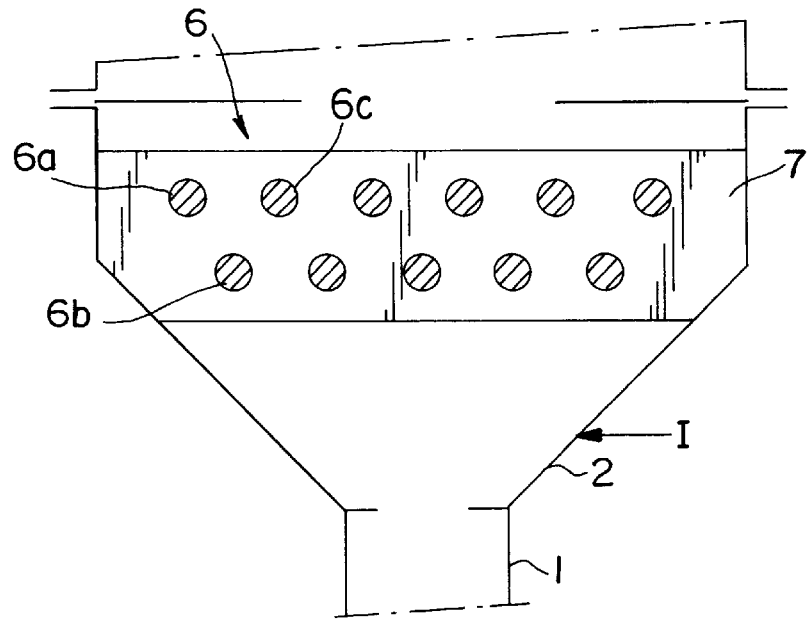
FIG. 6A shows another impacter-diffuser configuration.
Figure 6B:
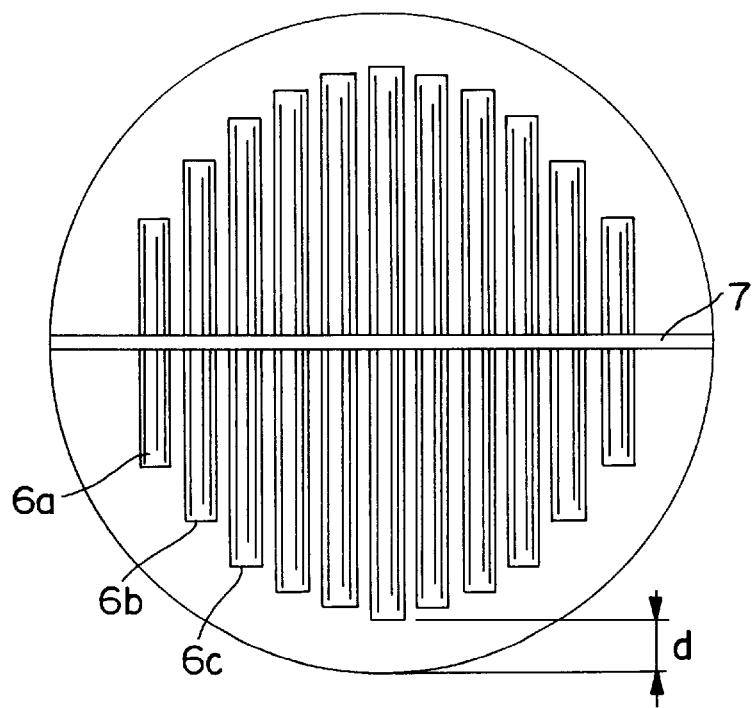
FIG. 6B shows a plan view of the impacter-diffuser of FIG. 6A.

FIG. 6 (FIGS. 6A, 6B) shows another variation of an impacter-diffuser (6), comprising a plurality of rectilinear bars (6a, 6b, 6c) with a circular cross-section, substantially parallel and disposed on two levels. These bars are supported by a single central brace (7) substantially perpendicular to the axis of the bars. The extremity of the bars is located at a distance d from the cone of at least 30 mm.

According to FIG. 6B, the projections of the bars are not contiguous, the projected free space being at the most 30% of the total space seen from the line. Preferably an impacter which, viewed from above, is totally opaque is used, the bars of one row occupying the interstices of the other row.

The facility according to the invention operates in the following manner: continuous or preferably discontinuous injections of solid particles are carried out sequentially for each of the transfer line exchangers (or furnaces comprising several transfer line exchangers). The solid erosive particles are transported by pneumatic transport towards the injection lines (I) by a carrier gas such as fuel gas, nitrogen or steam. The particles can be supplied from a silo of new particles or conversely be separated downstream of the transfer line exchangers and at least in part recycled. The manner of pneumatic transportation can be a dense phase transport or diluted phase transport, in a continuous or pulsed regime, and use means well known to the man skilled in the art, such as valves, locks, feed screws or switching.

The particles injected via the lines (I) enter the cone (2) but are not instantly dispersed by the flow of cracked gases. The non-homogeneous mixture of cracked gases/particles arrives at the level of the impacter-diffuser where the gas is diffused via passages (E) in several directions; the majority (70% or 90% or 100%) of the particles rebound on the solid surfaces of the impacter-diffuser and are themselves diffused and dispersed secondarily via the passages (E) and around the impacter-diffuser and divided up in a correct manner in the different tubes (4) of the exchanger.

The quantities of particles which it is necessary to inject can be determined simply by means of the outlet temperature of the transfer line exchanger, wherein it is sought to limit the drift thereof to a value of less than 30° C. per month, for example.

The invention is illustrated by the following example:

In a transfer line exchanger (TLE) with a capacity of 10,000 kg/h of cracked gases, 50 kg of angular coke with an average grain size of 150 to 300 micrometers is injected every 10 hours. The injection frequency is later modified (increased or reduced) to limit the TLE outlet temperature drift to 30° C. per month. The circulation velocity in the lines (I) (in the cylindrical part thereof, the connecting piece being possibly tapered) is 25 m/s.

For a pilot impacter-diffuser, in an experimental set-up, comprising 2 levels of solid surfaces with a rectangular cross-section (as in FIG. 2) according to the particles used and the length L, variable between 0.4×D and 0.8×D, a correct distribution (maximum difference varying between 9 and 21% with respect to the average value) was obtained, solving the technical problem posed, and without any blockage or any trace of erosion of the tube plate.

The invention thus allows advantageous solution of all the specifications of the technical problem set, contrary to the known devices.

We claim:

1. A facility for steam cracking of hydrocarbons comprising at least one cracking furnace provided with at least one cracking zone with at least one pyrolysis tube connected downstream by means of a transfer line (1) to an inlet cone (2) of a transfer line exchanger (3) for the effluent of this zone with an inlet tube plate (5), the facility also comprising at least one injection line (I) for solid particles for at least partial removal, carried out in line, of the coke deposited in the exchanger tubes, said facility comprises:

a particle impacter-diffuser (6), comprising solid surfaces disposed opposite the transfer line (1), in the interior of said inlet cone (2), said impacter-diffuser being permeable to gases via a plurality of gas passages, but at least 70% opaque seen from said transfer line (1) situated upstream, said injection line (I) opening out into a point of introduction of the particles, situated at a distance L upstream of the impacter-diffuser, not exceeding 2.5 times the diameter D of the tube plate of the transfer line exchanger.

2. The steam cracking facility according to claim 1, in which the distance L of the extremities of the injectors upstream of the impacter-diffuser is between 0.1×D and 1.0×D, D being the diameter of the tube plate.

3. A steam cracking facility according to claim 1, in which the impacter-diffuser is at least approximately 90% opaque, viewed from the transfer line (1).

4. A steam cracking facility according to one of claim 1, in which the number of injection lines is between 1 and 8, including boundaries.

5. A steam cracking facility according to claim 1, characterised in that the injection lines (I) open out into the zone of the inlet cone of the exchanger.

6. The facility according to one of claim 1, wherein the injection points at the extremity of the injection lines are substantially flush with the level of the internal surface of the assembly formed by the transfer line (1) and the inlet cone (2).

7. A facility according to claim 1, characterised in that the extremities of the injection lines are located at the same level in the direction of flow of the effluent.

8. A steam cracking facility according to claim 1, comprising a zone for deceleration of the effluent in a part of the cone with a tapering internal surface with an angle to the highest point less than or equal to 20°, into which the injection lines open out.

9. A steam cracking facility according to claim 8, in which the injection lines open out into the second downstream half of the deceleration zone with an angle to the highest point less than or equal to 20°.

10. A steam cracking facility according to claim 1, in which the injection points are located at a level where the cross-section of the passage for the flow is increased by at least 25% with respect to the passage cross-section of the terminal part of the transfer line (1).

11. A steam cracking facility according to claim 1, characterised in that the impacter-diffuser comprises solid surfaces and voids, disposed on two levels at least in the direction of flow of the effluent, the voids on one of the two levels being substantially opposite the solid surfaces of the other level.

12. A steam cracking facility according to claim 1, in which the impacter-diffuser is constituted by discs or toroidal rings with a substantially circular, rectangular or square cross-section.

13. The steam cracking facility according to claim 1, in which the impacter-diffuser comprises a plurality of rectilinear bars with rectangular, square or circular cross-section, substantially parallel and disposed at at least one level.

14. A steam cracking facility according to claim 13, in which the bars are supported by a single central brace, substantially perpendicular to the axis of the bars.

15. The process for steam cracking of hydrocarbons in steam cracking facility according to claim 1, wherein effluent cracked gases from a steam cracking zone are introduced via a transfer line (1), tapered towards the highest point at an angle of less than or equal to 20°, upstream of the tube plate of a transfer line exchanger, such as to reduce the velocity of these gases to a value of between 0.07 and 0.7 times their velocity in the terminal part of the transfer line, in that erosive solid particles are injected in a discontinuous manner into these gases, the velocity of which is reduced, from at the most 1 meter upstream of an impacter-diffuser, permeable to the gases via a plurality of passages and at least 70% opaque viewed from the transfer line, and in that the mixture of particles and cracked gases is circulated downstream of the impacter-diffuser in the tubes of the transfer line exchanger to limit its coking, the quantities of injected particles being sufficient for the outlet temperature of the transfer line exchanger not to increase by more than 100° C. per month.

16. A process according to claim 15, characterised in that the instantaneous delivery of particles at the moment of injection is between 0.5 and 25% by weight with respect to the cracked gases, and in that the particles have an average size of between 0.02 and 4 mm.

17. The process according to claim 15, wherein the particles are materials selected from the group consisting of coke, silicon carbide, simple or combined oxides or silicon, aluminium and zirconium and are at least partially angular.

18. The steam cracking facility according to claim 2, wherein the distance L of the extremities of the injectors upstream of the impact-diffuser is between $0.15 \times D$ and $0.8 \times D$, D being the diameter of the tube plate.

19. The steam cracking facility according to claim 4, in which the number of injection lines is between 2 and 6, including boundaries.

20. The facility according to claim 6, wherein the injection points at the extremity of the injection lines are at the level of the internal surface of the inlet cone of the exchanger.

21. The steam cracking facility according to claim 13, in which said rectilinear bars are substantially parallel and disposed at at least two levels.

22. The process for steam cracking of hydrocarbons in steam cracking facility according to claim 15, wherein the quantities in injected particles being sufficient for the outlet temperature of the transfer line exchanger not to increase by more than 30° C. per month.

* * * * *